Figure 1:
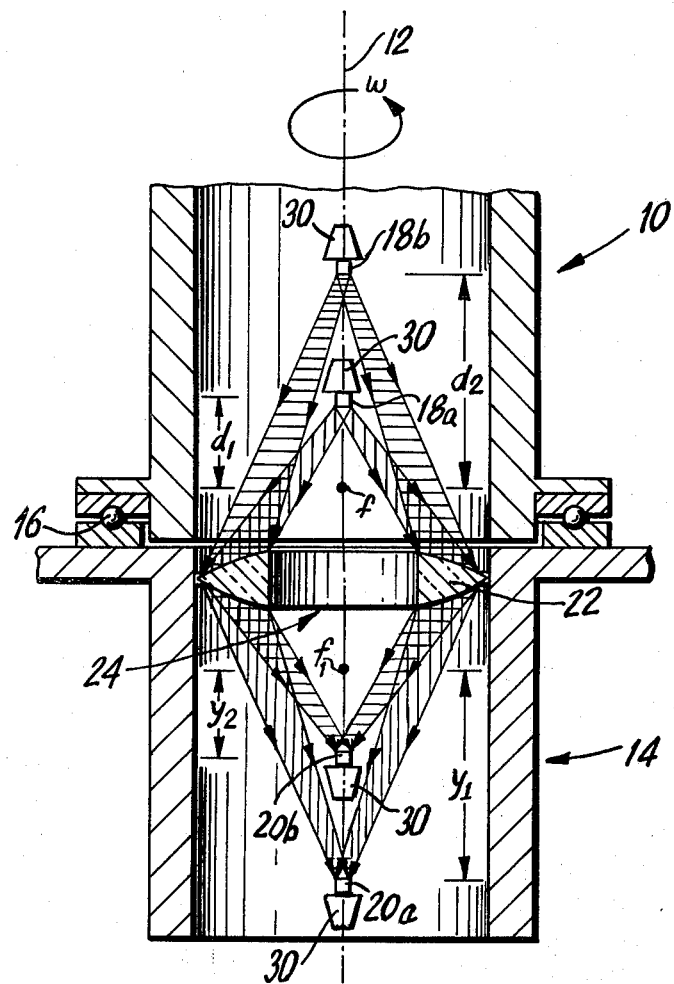

United States Patent [19]

Tarasevich

[11] 4,178,515
[45] Dec. 11, 1979

[54] OPTICAL SIGNAL COMMUNICATING APPARATUS

[75] Inventor: Andrew Tarasevich, Califon, N.J.

[73] Assignee: Lockheed Electronics Co., Inc., Plainfield, N.J.

[21] Appl. No.: 905,545

[22] Filed: May 12, 1978

[51] Int. Cl.² .................................................. G02B 27/00
[52] U.S. Cl. ................................. 250/551; 250/216
[58] Field of Search .......................... 250/551, 216, 199

[56] References Cited
U.S. PATENT DOCUMENTS 3,619,612  11/1971  Belke et al. ................... 250/83.3 H Primary Examiner—David C. Nelms
Assistant Examiner—Darwin R. Hostetter
Attorney, Agent, or Firm—Hopgood, Calimafde et al

[57] ABSTRACT

A noncontacting data-transmission system for transmitting data between rotating and nonrotating members includes at least one light source capable of transmitting modulated light signals disposed in one of the members. At least one light detector arranged along the same optical axis as the source and along an axis coincident with the axis of rotation of the rotating members is located in the other of the members. A lens having an optical center lying on an axis coincident with the axis of rotation of the rotating member is interposed between the light source and detector. The detector is located at the conjugate of the light source, such that an image of the light source is formed by the lens at the detector. The central portion of the lens may be modified, such as by forming a central opening in the lens, such that only an annular portion of the lens is utilized to form the image of the light source on the detector. In an embodiment of the invention disclosed, a plurality of data-transmitting light sources and detectors are coaxially arranged at conjugate positions in the members undergoing relative rotation.

5 Claims, 2 Drawing Figures

OPTICAL SIGNAL COMMUNICATING APPARATUS

The present invention relates generally to data transmission and, more particularly, to noncontacting apparatus for transmitting or coupling single or multiple channel data between a rotating and a stationary member.

It is frequently necessary to transmit information generated on a rotating member, such as a transducer or a receiver-laden shaft of a rotating antenna or gun mount, to data-processing equipment contained on a stationary member where the information received from the rotating member is processed for subsequent utilization. Although other data-coupling techniques have been proposed, such as that disclosed in U.S. Pat. No. 3,619,612, data transmission from a rotating to a stationary member is still commonly effected by the use of mechanical slip rings, radio frequency telemetering links, or the like. Slip rings, and particularly the brushes conventionally used in slip rings, are, however, subject to wear and failure, require periodic replacement, and are a source of electrical noise. Moreover, in systems requiring the use of a number of slip rings to couple multiple channel data between rotating and stationary members, the cost and size of the slip rings both become large. Thus, in many data-transmission systems used in coupling data between a rotating and a stationary member, the use of slip rings presents the most significant source of possible error and failure in the data distribution and processing. Similarly, radio telemetering signal coupling apparatus is a frequent source of system complexity and expensive, as well as channel cross-talk and other errors.

It is thus an object of the present invention to provide improved data coupling apparatus.

It is a further object of the present invention to provide apparatus for transmitting data between associated rotating and stationary members, which does not require the use of mechanical components such as slip rings, complex electronic telemetering circuitry, or the like.

It is another object of the present invention to provide a reliable and yet relatively inexpensive system for transmitting data between a rotating member and a stationary member.

It is yet a further object of the invention to provide a data transmission system of the type described, which is well suited for use in transmitting plural data channels.

It is still another object of the invention to provide a data transmission system for use in transmitting several channels of data from a rotating member to a stationary member while allowing for the further passage of auxiliary components between the members.

To these ends, the system for transmitting or coupling data from or between a stationary and a rotating member according to the present invention comprises at least one source of data-modulated light located in one of the members and lying on an optical axis that is coincident with the axis of rotation of the rotating member. A lens having an optical center lying along the same axis is fixedly mounted to one of the members, and at least one light detector is located in the other of the members along the same axis and at the optical conjugate of the light source.

The present invention also contemplates the use of a plurality of light sources located and arranged along a common axis in the members, and a corresponding plurality of light detectors located at the respective conjugates of the light sources. To prevent cross-talk between the plurality of data communication channels established between the associated pairs of light sources and detectors, the central portion of the lens is not utilized to direct light from the sources onto the receivers. To this end, as in one embodiment of the invention herein disclosed, the central portion of the lens may have a central opening formed therein, leaving only an annular lens portion, or the central portion of the lens may be obscured. The former arrangement provides the additional benefit of permitting components that are unrelated to data transmission to be passed through the central opening between the stationary and rotating members.

Figure 2:
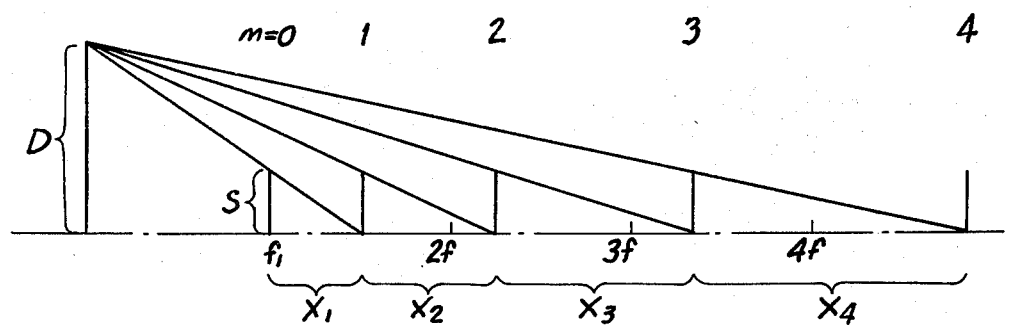

To the accomplishment of the above and to such further objects as may hereinafter appear, the present invention relates to a data coupler substantially as defined in the appended claims and as described in the following specification, as considered with the accompanying drawing, in which:

FIG. 1 is a schematic elevation, in cross section, of a data transmission system in accordance with an embodiment of the present invention; and FIG. 2 is a graphical illustration of the relationship obtaining between the location of the lens and of the light sources of the data transmission system of the invention.

The data transmission system of the present invention transmits data produced on a rotating member, herein shown as a shaft 10, which may for example be the rotating antenna mount of a radar or telemetry system, and which rotates about a central axis 12 in the direction of the arrow w, to a stationary or non-rotating member 14. Shaft 10 is mounted on bearings 16 provided on member 14 to permit free rotation of the shaft. The data to be transmitted is preferably in binary form and may typically embody measured and/or computed or derived information generated by electrical transducers, sensors, or other structures disposed on the rotating member. This binary data may be derived in any known manner, such as by an analog-to-digital converter (not shown) operating upon multiplexed transducer outputs.

As shown in FIG. 1, a plurality (here two) of light-emitting sources 18a and 18b, which may be light-emitting semiconductor diodes such as gallium-arsenide diodes producing impulses in either the infrared or visible light spectrum upon the application of an electrical signal thereto, are mounted within the interior of shaft 10. The sources 18a and 18b are both located along axis 12 and are spaced from one another along that axis. The light sources receive the binary data by suitable means (not shown for the sake of clarity) and produce output light impulses that correspond to the received input binary data.

A corresponding number of light receivers or detectors 20a and 20b, which may advantageously comprise photocells, photodiodes or the like, are located within nonrotating member 14 and are also arranged and spaced along axis 12. A lens 22, shown in FIG. 1 as being fixedly mounted at the interior of nonrotating member 14, is interposed between the light sources 18 and light detectors 20. The optical axis of lens 22 is substantially coincident with the axis of rotation 12.

The arrangement of the light sources 18 and the light detectors 20 is such that images of the light signals emitted from each of the sources 18a and 18b are formed by lens 22 at the position of light detectors 20a and 20b, respectively; that is, the detectors 20a and 20b are located at the optical conjugates of light sources 18a and 18b, respectively. Thus, in FIG. 1, where f and $f_1$ are the focal lengths of lens 22, $d_1$ is the distance between focal point f and light source 18a, and $y_1$ is the distance between focal point $f_1$ and light detector 20a located at the conjugate of light source 18a:

$$ff_1 = d_1 y_1$$

Similarly, for source 18b and detector 20b:

$$ff_1 = d_2 y_2$$

Although the data transmission system of the invention has been hereinabove described for two channels of data transmission, it may also be advantageously used to provide additional data channels by arranging additional light sources and light receivers at appropriate locations in members 10 and 14 along axis 12. Further, it is observed that any desired mix of light sources/detectors may be included in the members 10 and 14 undergoing relative rotation for bilateral communications if desired.

Also, as shown in the embodiment of FIG. 1, the central portion of lens 22 may be removed, thus forming a central opening 24 therein. The annular lens section 22 is effective and sufficient to direct the light signals from the light sources onto the appropriate light detectors. The vacant central portion 24 of lens 22 may be employed to pass elements such as rotary couplers, cables and the like between members 10 and 14. Moreover, the removed (or obscured) central lens portion eliminates inter-channel cross talk otherwise caused by direct axial transmission.

The maximum number of light-transmitting and receiving or detecting elements that may be employed in the data transmission system of FIG. 1 can be determined from the graphical illustration of the optical system provided in FIG. 2. As therein shown, the maximum number of data transmitting and receiving elements is determined by the semidiameter (radius) of the central obscuration D of lens 22, which, in FIG. 1, is the radius of central opening 24, and S is the semidiameter of the light-receiving or transmitting apertures in the on-axis elements 18 and 20. Starting with the limiting close point at which an element can be placed—one focal length—the spacing to the nth element is given by:

$$X_n = \frac{S(f + \sum_{j=1}^{n-1} X_j)}{D - S}$$

where f is the effective focal length of lens 22 and $X_1 \ldots X_n$ are the spacings between the elements. Consequently, to maximize the number of elements that can be contained in a given data transmission system according to the invention, the size of the lens should be maximized and the diameter of the active light receiving and transmitting elements should be reduced as far as is practical.

It will thus be appreciated that the data transmitting system of the present invention is relatively free of complexity and is inexpensive compared with conventional systems for transmitting data between a rotating and a stationary member, and yet provides effective, high-speed and reliable transmission of data. A large number of channels of data can be transmitted at high speeds through theuse of a single lens, and the use of wide-band light receivers permits a high data rate per channel. Since all the transmitting and detecting elements are located on the axis of rotation of the rotating member, the rotation of the shaft does not affect the signal level at the detector and this axial arrangement of elements eliminates the need for a derotating element.

It will also be appreciated that although the data transmission system of the invention has been described herein as transmitting data from elements in a rotating shaft to receivers in a stationary member, it may also be used in whole or in part to transmit data from a stationary member to a rotating member by arranging some or all of the light-emitting elements in the latter and the light-receiving elements in the former. In addition, the light-emitting diodes and light-receiving elements may be replaced by a series of fiber optic cables having emitting or receiving apertures located at conjugate positions on the optical axis. This configuration permits the use of the data coupler of the invention as an integral part of a fiber optic transmission system, which can be used, for example, to transmit EMI free signals on a rotating radar mast.

It will thus be appreciated that these and other modifications may be made in the embodiment of the invention hereinabove specifically disclosed, all without departing from the spirit and scope of the invention. Thus, for example, axial optical blocking elements 30 may be employed for cross talk reduction.

What is claimed is:

1. Apparatus for coupling data between first and second members undergoing relative rotation about an axis of relative rotation, said apparatus comprising at least one light-emitting means located on one of said members, at least one light-detecting means located on the other of said members, and a light-directing means carried by one of said members and effective to direct light from said light emitting means onto said light-detecting means, said light-emitting means and said light-detecting means being arranged in communicating pairs, spaced from one another along a common optical axis substantially coincident with said axis of relative rotation, and located at conjugate optical positions on opposite sides of said light-directing means, the optical center of said light-directing means lying on an axis substantially coincident with said axis of relative rotation.

2. The apparatus of claim 1, comprising a plurality of said light-emitting means and a corresponding plurality of light-detecting means arranged and spaced from one another along said axis, said plurality of light-detecting means being located at the respective conjugate positions from said light-emitting means.

3. The apparatus of claim 2, in which said light-directing means comprises a lens of which only an annular portion is effective to direct light from said light-emitting data sources onto the respective ones of said light-detecting elements.

4. The apparatus of claim 3, in which said lens has a central opening formed therein.

5. The apparatus of claims 2 or 3, further comprising optical blocking means located on said axis of relative rotation intermediate said light-emitting means and light-detecting means.

* * * * *